(12) United States Patent
Ender-Lercher et al.

(10) Patent No.: US 12,173,738 B2
(45) Date of Patent: Dec. 24, 2024

(54) JOINING SYSTEM FOR MECHANICALLY JOINING TWO MATERIALS

(71) Applicant: Lercher GmbH, Klaus (AT)

(72) Inventors: Sandra Ender-Lercher, Klaus (AT); Dominik Lercher, Klaus (AT)

(73) Assignee: VAT HOLDING AG, Haag (CH)

( * ) Notice: Subject to any disclaimer, the term of this patent is extended or adjusted under 35 U.S.C. 154(b) by 311 days.

(21) Appl. No.: 16/937,234

(22) Filed: Jul. 23, 2020

(65) Prior Publication Data
US 2021/0025422 A1   Jan. 28, 2021

(30) Foreign Application Priority Data

Jul. 23, 2019  (EP) .................................. 19187929
Jul. 15, 2020  (EP) .................................. 20186023

(51) Int. Cl.
*F16B 12/46*  (2006.01)
*F16B 13/02*  (2006.01)

(52) U.S. Cl.
CPC .............. *F16B 12/46* (2013.01); *F16B 13/02* (2013.01)

(58) Field of Classification Search
CPC .......... F16B 12/24; F16B 12/26; F16B 12/36; F16B 12/38; F16B 2012/103; F16B 5/0024; F16B 13/02; F16B 2013/009
USPC .................................. 403/DIG. 11, DIG. 13
See application file for complete search history.

(56) References Cited

U.S. PATENT DOCUMENTS

| | | | | |
|---|---|---|---|---|
| 1,749,547 A | * | 3/1930 | Ruddy | F16B 12/24 411/389 |
| 3,129,472 A | * | 4/1964 | Hensel | F16B 12/22 403/231 |
| 3,438,659 A | * | 4/1969 | Lawrence | F16B 15/0046 411/24 |
| 5,468,109 A | * | 11/1995 | Ferrari | F16B 12/20 411/549 |
| 6,322,305 B1 | * | 11/2001 | Bantle | F16B 13/126 411/48 |
| 11,098,741 B2 | * | 8/2021 | Nitschmann | F16B 5/0024 |
| 2007/0003363 A1 | | 1/2007 | Tseng | |
| 2007/0160418 A1 | * | 7/2007 | Lo | F16B 13/02 403/275 |
| 2019/0195258 A1 | * | 6/2019 | Zimmer | F16B 13/0858 |
| 2021/0381538 A1 | * | 12/2021 | Merz | F16B 12/10 |

FOREIGN PATENT DOCUMENTS

| | | | | |
|---|---|---|---|---|
| DE | 12 02 949 B | | 10/1965 | |
| DE | 2701833 A1 | * | 7/1978 | ............ F16B 12/24 |
| DE | 199 23 107 C1 | | 9/2000 | |
| WO | WO-2015015857 A1 | * | 2/2015 | ............ F16B 12/26 |
| WO | WO-2019038990 A1 | * | 2/2019 | ............ B60R 13/00 |

* cited by examiner

*Primary Examiner* — Amber R Anderson
*Assistant Examiner* — Zachary A Halu
(74) *Attorney, Agent, or Firm* — Muncy, Geissler, Olds & Lowe, P.C.

(57) ABSTRACT

A joining system for mechanically joining two materials is disclosed. A receiving device having a sleeve which surrounds an axis of extension and which is designed to receive a pin, and a plug-in device having the pin, where the joining system is configured such that, when the pin is inserted in the sleeve, the pin is clamped to the sleeve in the axial direction in relation to the axis of extension on account of a spring element of the receiving device being pushed radially against a belly region of the pin.

17 Claims, 6 Drawing Sheets

JOINING SYSTEM FOR MECHANICALLY JOINING TWO MATERIALS

Figure 1:
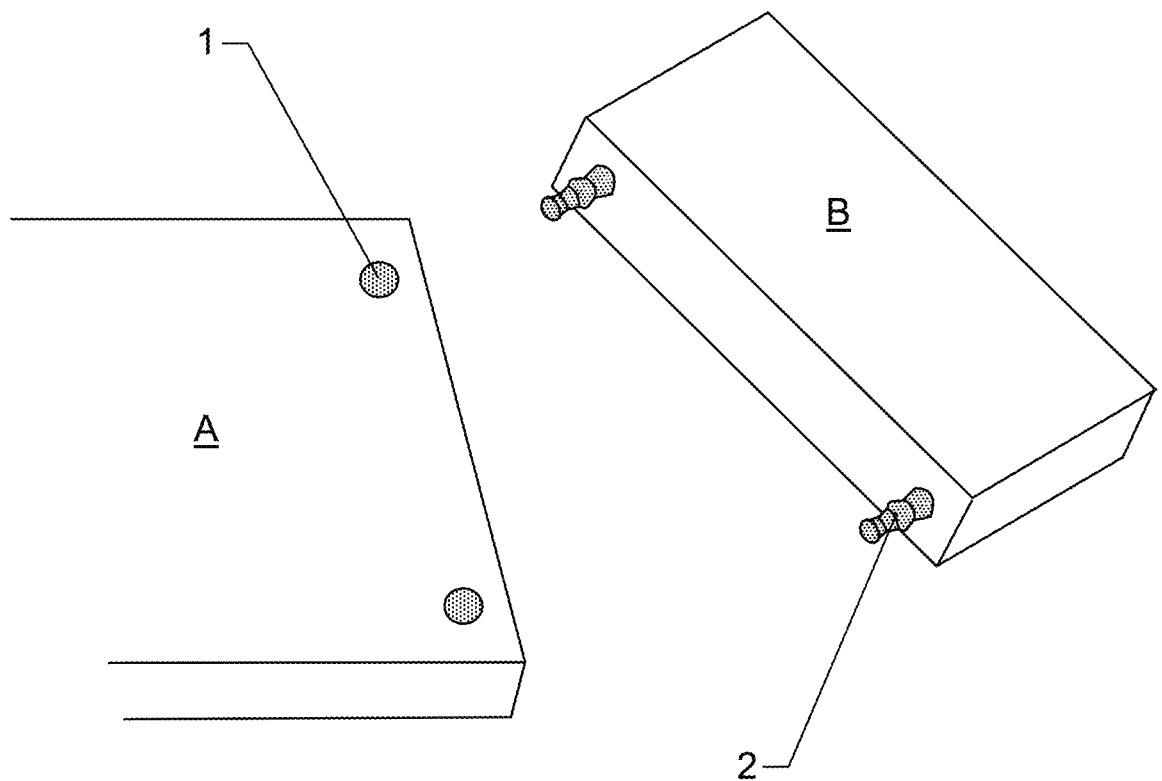

The present application claims priority to European Patent application 19187929.5 filed Jul. 23, 2019 which is herein incorporated by reference in its entirety.

The invention relates to a joining system for mechanically joining two materials by means of a receiving device, which is anchored in one material, and a plug-in device, which is anchored in a material to be joined thereto.

Mechanical joining systems are used for example in furniture construction to join two components, such as wooden panels for example. Joining systems are known which are primarily intended to facilitate or ensure a mutual orientation when adhesively bonding the two components. Also known are joining systems which are designed to mechanically join together permanently the two components that are to be joined, for example in combination with an adhesive bonding of the two components. The latter systems in particular typically require an increased installation effort and space requirement as well as the use of a special tool at the time of installation in the workpieces. In addition, such systems from the prior art often require additionally auxiliary tools when subsequently assembling the two workpieces, such as for example screwdrivers and clamps, so as to ensure an optimal joining and adhesive bonding of the components.

It is an object of the invention to provide an improved joining system for mechanically joining two materials, in particular a joining system with a reduced installation complexity and space requirement, as well as easier handling when assembling materials equipped with the joining system.

This object is achieved by implementing at least some of the characterizing features of the independent claim. Features which develop the invention in an alternative or advantageous manner can be found in the dependent claims.

The invention relates to a joining system for mechanically joining two materials, for example in the field of furniture construction, by means of a receiving device which has a sleeve that surrounds an axis of extension and is designed to receive a pin, in combination with a plug-in device which has the pin. The joining system is configured such that, when the pin is inserted in the sleeve, the pin is clamped to the sleeve in the axial direction in relation to the axis of extension, wherein the pin and the sleeve are pushed axially against one another along a biasing section.

The invention also relates to the receiving device and the plug-in device for use in the inventive joining system.

On the one hand, the joining system prevents the materials from being able to move laterally relative to one another. On the other hand, the joining system is self-clamping along the axis of extension, as a result of which there is no need to use a carcass press or screw clamp for example when adhesively bonding the materials. An easier-to-handle joining system is provided as a result, for example for (temporarily) fixing in place two components during the curing of an adhesive arranged therebetween. Alternatively, the inventive joining system may also be designed such that the components can be joined to one another only mechanically, that is to say without the use of adhesive.

For example, the receiving device and the plug-in device are tailored to one another and configured such that the length of the biasing section is at least 0.5 mm, in particular at least 1 mm, especially wherein the length of the biasing section is between 1 to 2 mm.

The joining system according to the invention, or the receiving device and the plug-in device, can be used to join materials of different type, for example materials such as wood, for example solid wood or chipboard, plasterboard, brick, concrete, or composite material.

The receiving device has an elongate shape formed along an axis of extension and has at a front end a barb arrangement for anchoring the receiving device in a bore in a material. The barb arrangement has a main body, surrounding the axis of extension, with spreading elements protruding radially from the main body, which spreading elements are configured such that, when the barb device is pressed into the bore, they exert a hooking effect to inhibit the release of the barb arrangement from the bore. The receiving device also has a sleeve for receiving the pin, which sleeve surrounds the axis of extension, is connected to the barb arrangement and is accessible from a rear end located opposite the front end, wherein the sleeve has a biasing arrangement for biasing the pin in the direction of the front end. The receiving device therefore has a sleeve which is open towards the rear end, which sleeve is connected to the barb arrangement and surrounds the axis of extension. The internal volume of the sleeve may be bounded or closed off towards the front end, for example in the region of the barb arrangement. The receiving device may have at the rear end a sleeve for receiving the pin, which sleeve surrounds the axis of extension and is connected to the barb arrangement, wherein the sleeve has a biasing arrangement for biasing the pin in the direction of the front end. The sleeve in this case is configured such that the biasing arrangement has a spring element which is configured to interact with a belly region of the pin. When the pin is inserted, the spring element pushes against the pin, in particular against the belly region of the pin, by way of a force acting radially relative to the axis of extension. By virtue of the interaction of the spring element with the belly region, an axial force acting along the axis of extension towards the front end is generated on the pin. In response to the axial force, the pin is pushed into the sleeve along the axis of extension towards the front end within a biasing section on the sleeve.

In one embodiment, for example, the sleeve and the barb arrangement are designed such that they are each outlined by a circular cylinder, wherein the circular cylinder outlining the sleeve has a larger cylinder radius than the circular cylinder outlining the barb arrangement. In other words, the receiving device is shaped such that the workpiece can be prepared for the installation of the receiving device by means of a two-stage bore, that is to say by means of two simple bores each having a different bore diameter. Standard drills having a relatively small bit diameter, for example of 8 mm, can be used for this, with no special tool, for example no undercut, being required. Even filigree panels for example can thus be joined to one another.

In another embodiment, the sleeve has a latching arrangement which is configured to cooperate (abut, engage, etc.) with an edge of the pin, wherein a cooperation of the latching arrangement with the edge enables the pin to be inserted into the sleeve in the direction of the front end but inhibits it from being pulled out in the direction of the rear end.

In particular, the latching arrangement may have a pawl, in particular at least two pawls, configured to engage in (or butt against) the edge of the pin, wherein the pawl is biased towards the axis of extension such that it enables the pin to be inserted into the sleeve in the direction of the front end but, by engaging in the edge, inhibits it from being pulled out in the direction of the rear end. By way of example, the latching arrangement is arranged closer than the biasing arrangement to the front end.

In particular, the joining system is designed such that, once coupling has taken place, the sleeve and the pin are no longer separable from one another without destruction.

In another embodiment, the sleeve is configured such that the biasing section on the sleeve is bounded in the direction of the rear end by the pawl, which acts as a stop for the edge when the pin is inserted.

In another embodiment, the spring element forms the latching arrangement of the sleeve and is configured to cooperate with (engage in or butt against, etc.) the edge of the pin. The spring element is biased towards the axis of extension such that said spring element enables the pin to be inserted into the sleeve in the direction of the front end but, by cooperating with the edge, inhibits it from being pulled out in the direction of the rear end.

The spring element is designed and shaped such that (once the pin has been inserted into the sleeve) it continuously provides the biasing force for pushing the pin into the sleeve and keeping it there. In addition, the spring element at the same time forms a retaining element which, by acting on, butting against or engaging in the edge of the pin, prevents the pin from being pulled out of the sleeve. A spring element designed in this way thus simultaneously provides these two functions which are highly advantageous for the operation of the joining system.

The spreading elements of the barb arrangement act as barbs. Upon penetrating into certain materials, such as wood for example, they may also roughen up material fibres as they penetrate therein, as a result of which, if a release attempt is made, the retaining force is improved and powerful anchoring is brought about when pulling due to the digging-in effect.

In another embodiment, the spreading elements are arranged in rings around the axis of extension which are spaced apart from one another in the axial direction of the axis of extension, for example in at least three spaced-apart rings, wherein the rings each have at least two, in particular at least four, mutually independent spreading elements, that is to say adjacent spreading elements of the same ring are spaced apart from one another. In other words, the rings have interruptions which give rise for example to a greater flexibility of the spreading elements, thereby reducing or preventing the destruction of the material as the barb arrangement enters the latter.

For example, the spreading elements are sawtooth-shaped, trapezoidal, pyramid-shaped or block-shaped and in particular have roundings.

In another embodiment, the receiving device and/or the pin is made of plastic, in particular of glass fibre reinforced plastic. By using glass fibre reinforced plastic material, it is possible for example to optimize the elasticity of the joining system.

In another embodiment, the spring element of the biasing arrangement is designed as a resilient lever element which extends along the axis of extension and which is configured such that, when the pin is inserted in the sleeve, a region of the lever element projecting from the sleeve pushes radially against the belly region of the pin.

In particular, the biasing arrangement has two resilient lever elements which are located opposite one another and extend along the axis of extension and which are configured such that, when the pin is inserted in the sleeve, a region of each lever element projecting from the sleeve pushes radially against the belly region of the pin.

The plug-in device configured for use with the biasing arrangement has an elongate shape formed along a plug-in axis, wherein, when the pin is inserted in the biasing arrangement, the plug-in axis is oriented substantially parallel or coaxial to the axis of extension of the receiving device.

The plug-in device likewise has at a front end a barb arrangement for anchoring the plug-in device in a bore in a material, wherein the barb arrangement may be designed in a manner substantially identical to the barb arrangement of the biasing arrangement, that is to say has a main body, surrounding the plug-in axis, with spreading elements protruding radially from the main body, which spreading elements are configured such that, when the barb device is pressed into the bore, they exert a hooking effect to inhibit the release of the barb arrangement from the bore. The plug-in device has at a rear end, located opposite the front end, a pin for insertion into a sleeve of a biasing arrangement of the type described above, which pin surrounds the plug-in axis and is connected to the barb arrangement. The pin has a belly region which surrounds the plug-in axis and which is dimensioned and shaped such that, when the pin is inserted in the sleeve, the belly region enters into interaction with a spring element of the sleeve such that, as a result of the spring element being pushed against a contact face of the belly region by way of a force acting radially relative to the plug-in axis, an axial force acting along the plug-in axis towards the rear end is generated on the pin.

For example, the pin has in the belly region a bulging shape which is asymmetrical or rotationally symmetrical with regard to a rotation about the plug-in axis and which provides the contact face for interaction with the spring element. A rotationally symmetrical bulge has the advantage, for example, that the pin, regardless of the direction of rotation thereof, can enter into interaction with the sleeve, that is to say no relative orientation of the pin is necessary in order to couple the latter to the sleeve.

In another example, the belly region has an element which projects radially from the pin and which provides the contact face, for example a spread-out wing or a spread-out arm. In this embodiment, too, it is advantageous if a plurality of projecting elements are arranged next to one another circumferentially around the plug-in axis, so that the contour of the pin has a rotationally symmetrical bulge in the belly region, wherein for example a plurality of spread-out arms are arranged circumferentially around the plug-in axis such that they form a funnel-shaped contour.

In one embodiment, the belly region of the pin is designed such that the contour of the belly region has a trapezoidal, pyramid-shaped or tubular bulge which in particular has roundings.

In one embodiment, the belly region of the pin may have a waist with my waist diameter which is defined in relation to the plug-in axis, and a belly end with a maximum belly diameter which is located at a distance from the waist along the plug-in axis. The belly diameter is larger than the waist diameter, the belly end is arranged closer than the waist to the rear end of the plug-in device, and a distance between the waist and the belly end defines a biasing section on the pin.

As a result, when the pin is inserted in the sleeve, the spring element can cooperate with the belly region such that a smaller axial force towards the rear end of the plug-in device is generated when the spring element interacts with the waist than when the spring element interacts with the belly end.

The belly region is in particular shaped and arranged such that it is brought into cooperation with the spring element of the sleeve when the pin is inserted in the sleeve, and the pin is thus pushed into the sleeve over at least part of the biasing section on the pin. This functionality is provided by the corresponding design of the sleeve and the resulting biasing section on the sleeve that is likewise provided.

As soon as the spring elements act on the belly end of the pin when the pin is inserted into the sleeve, that is to say as soon as these give rise to a force on the belly region acting radially relative to the axis of extension, the axial force towards the front end of the receiving device is generated. As a result, the pin is pushed into the sleeve. This force remains throughout the insertion movement, but decreases up to the point of reaching the waist (with the spring element). However, the axial force is in particular never equal to 0, but rather persists in the inserted state. The pin and the sleeve are dimensioned and shaped such that the point of contact of the spring element with the belly region cannot lie further in the direction of the front end of the plug-in device than the waist on the plug-in device. This can be achieved for example by a suitably limited depth of the sleeve, so that the pin can be inserted into the sleeve only over a certain distance.

The depression of the sleeve may extend along the axis of extension into the region of the barb arrangement, wherein the barb arrangement is formed radially on the outside of the receiving device and the depression of the sleeve is formed in the inner region of the receiving device.

By virtue of this design, on the one hand the biasing force is provided over a biasing section. On the other hand this biasing force remains even upon reaching the point of contact on the waist and thus provides the advantageous effect that, upon joining two workpieces with the receiving device and plug-in device according to the invention, said workpieces are held together with a given tensile force (corresponding to the biasing force) even after being joined.

In one embodiment, the pin additionally has an edge which surrounds the plug-in axis and which is configured such that, when the pin is inserted in the receiving device according to the above-described sleeve, the latching arrangement of the sleeve engages in or butts against the edge such that the plug-in device is inhibited from being pulled out of the sleeve in the direction of the front end of the plug-in device, in particular wherein the spring element or the pawl provides the function of the latching arrangement and the edge cooperates with the spring element or the pawl.

In one embodiment, the pin has an edge which surrounds the plug-in axis and which is configured such that, when the pin is inserted in the receiving device of the above type, which has a pawl, the pawl of the receiving device engages in the edge such that, when the pawl engages in the edge, the plug-in device is inhibited from being pulled out of the sleeve in the direction of the front end of the plug-in device.

The edge may in particular provide an edge face in the direction of the front end of the plug-in device, in particular wherein a normal to the edge face is oriented substantially parallel to the plug-in axis, and/or an outer diameter of the edge, in relation to the plug-in axis, is larger than the belly diameter.

The edge may in particular be formed directly adjacent to the belly region, in particular wherein the edge adjoins the belly end, and the edge, in particular the edge face, is configured and provided to cooperate with the spring element of the sleeve.

In one embodiment, the plug-in device has a stop which surrounds the plug-in axis and which has a stop face, provided in the direction of the front end of the plug-in device, for limiting an insertion depth for the plug-in device, wherein a normal to the stop face is oriented substantially parallel to the plug-in axis, and/or an outer diameter of the stop, in relation to the plug-in axis, is larger than the belly diameter, in particular is larger than the outer diameter of the edge, and wherein the stop is arranged between the barb arrangement and the pin.

By arranging such a stop, a desired strike-in depth or insertion depth of the plug-in device can be defined. In other words, the plug-in device can be plugged, pushed or struck into a bore provided for it only up to a particular part in the workpiece. This provides the advantage that a user of the plug-in device can use a relatively large depth tolerance to make the bore, wherein the plug-in device, regardless of the depth of the bore (if the bore has a minimum depth for insertion of the barb arrangement), is inserted up to an intended and desired amount by virtue of the stop. In particular, reliable cooperation with the receiving device can thus be provided, that is to say the plug-in device is always sunk in only so far that the pin can still be inserted deep enough into the sleeve and thus the biasing force can be generated.

The invention also relates to a joining system for mechanically joining two materials, in particular for furniture construction, comprising an above-described receiving device which surrounds an axis of extension and which is designed to receive a pin, and an above-described plug-in device having the pin. The joining system is configured such that, when the pin is inserted in the sleeve, the pin is clamped to the sleeve in the axial direction in relation to the axis of extension and the plug-in axis, wherein the pin and the sleeve are pushed axially against one another along a common biasing section.

In particular, the receiving device and the plug-in device may be tailored to one another and configured such that the length of the biasing section is at least 0.5 mm, in particular at least 1 mm. The length of the biasing section is especially between 1 to 2 mm.

Figure 2:
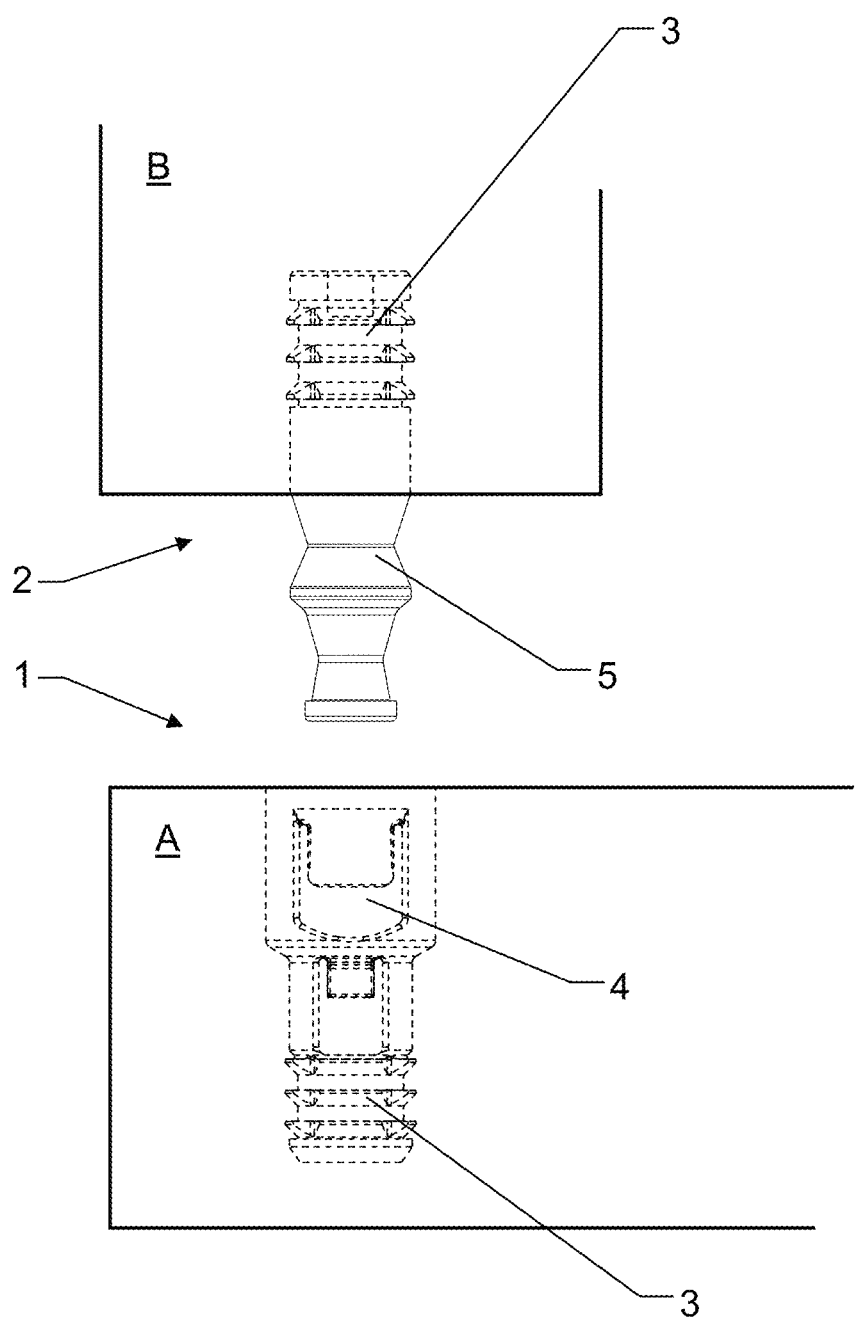
Figure 3:
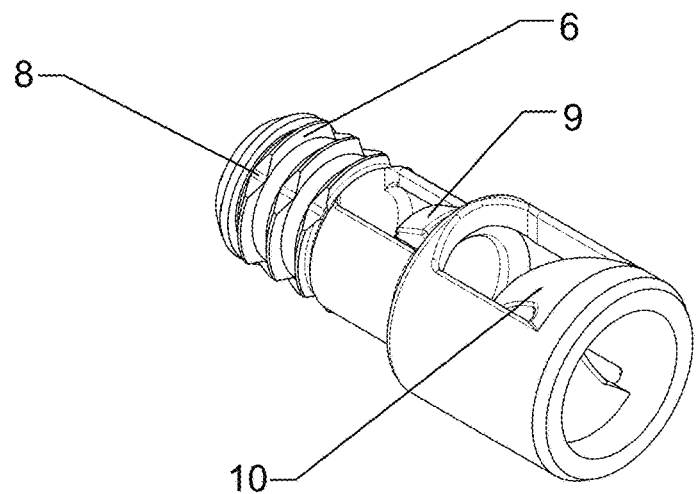
Figure 3:
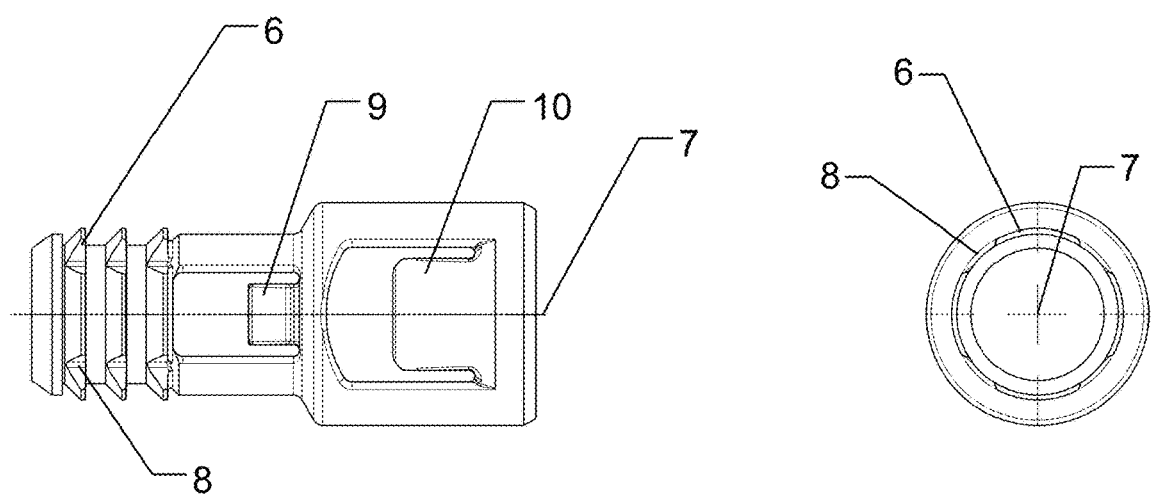
Figure 4:
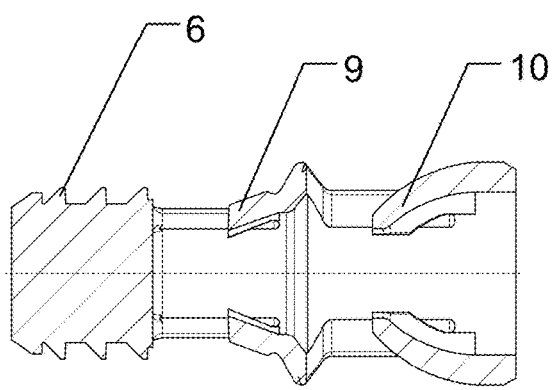
Figure 5:
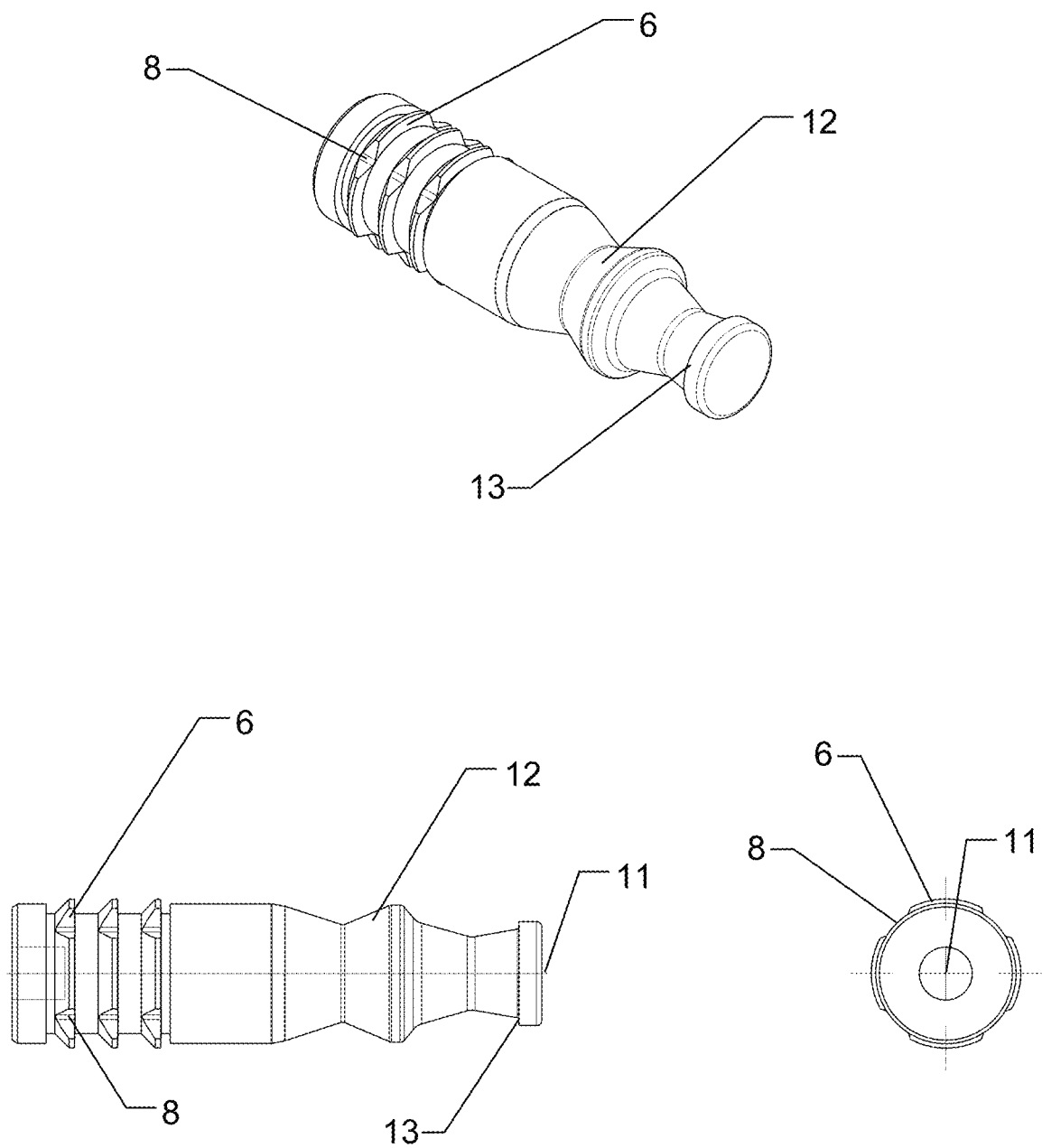
Figure 6:
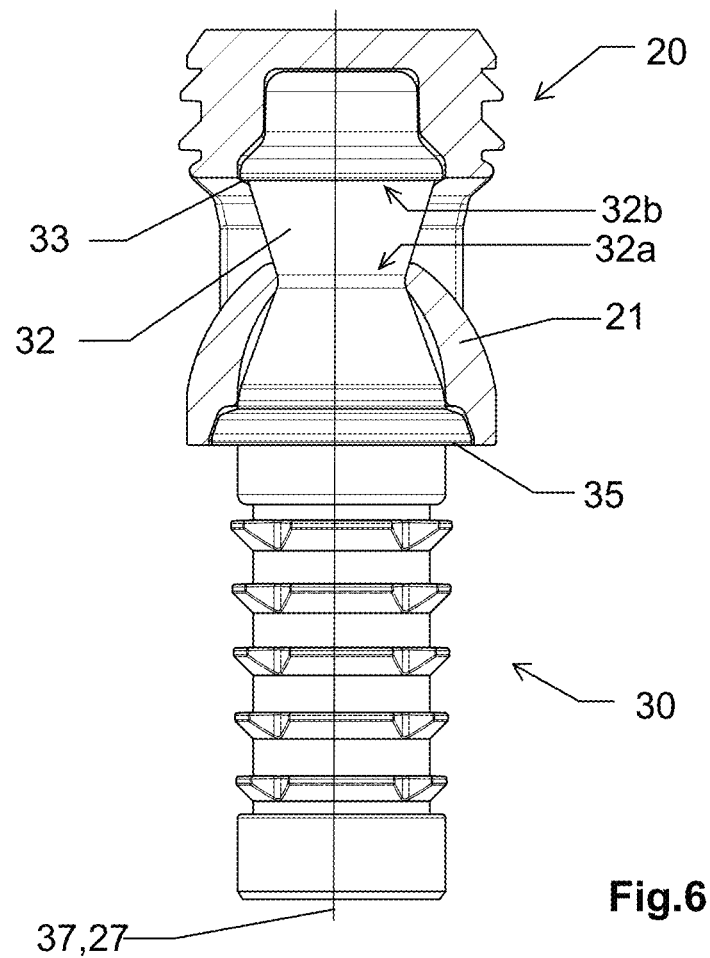
Figure 7:
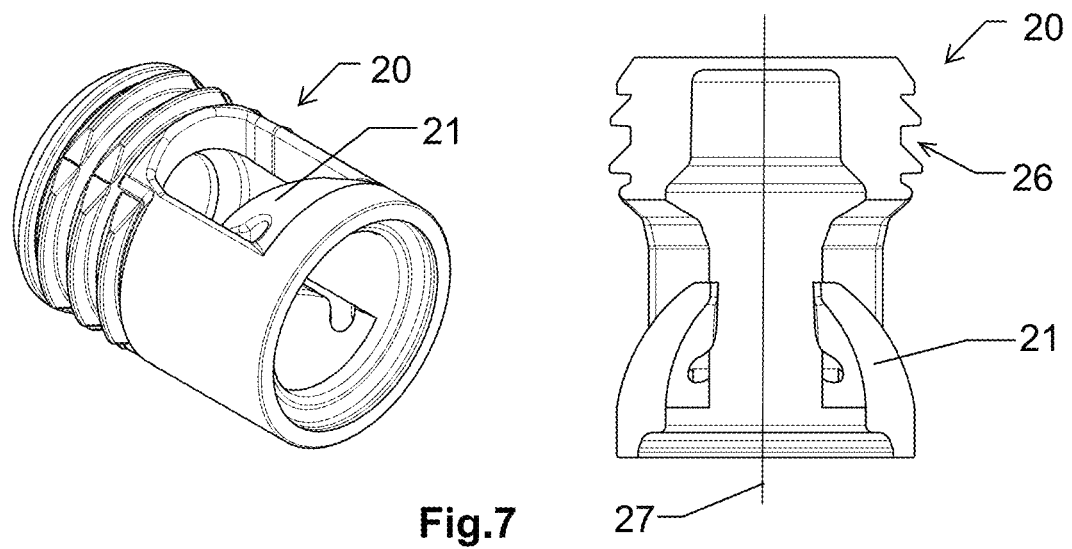
Figure 8:
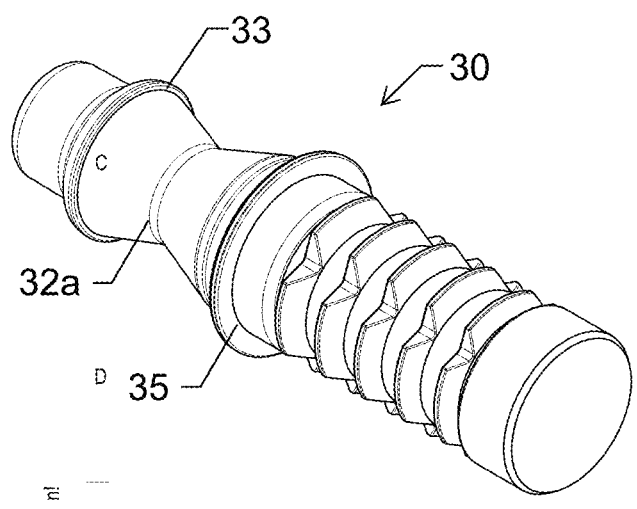
Figure 8:
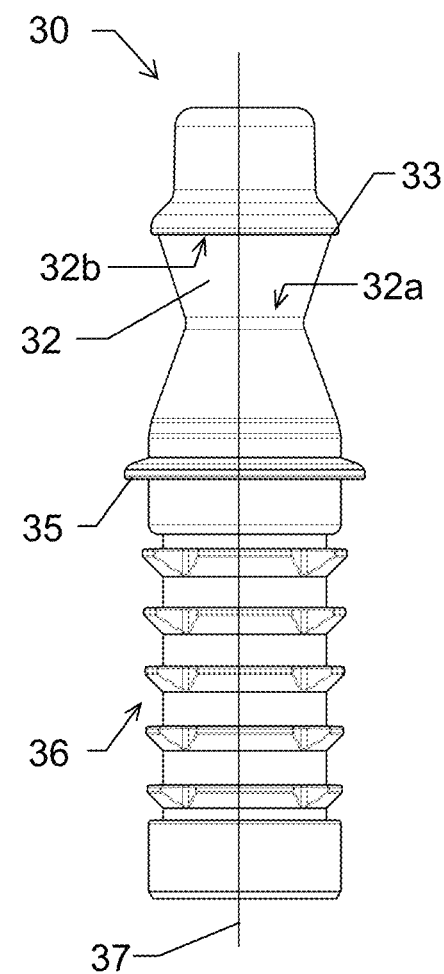

The joining system according to the invention comprising a receiving device and an associated plug-in device will be described in greater detail below, purely by way of example, on the basis of exemplary embodiments which are shown schematically in the drawings. In the figures, identical elements are labelled with identical reference signs. The described embodiments are generally not shown true to scale, and they are also not to be understood as limiting. In the figures:

FIG. 1: schematically shows an example of use of the joining system to join two wooden panels;

FIG. 2: shows a lateral detail view of the receiving device and plug-in device of FIG. 1 which are each anchored in a wooden panel and are to be coupled to one another;

FIG. 3: shows an exterior view of one embodiment of the receiving device in a profile view (top), in a side view (bottom left), and in a front view (bottom right);

FIG. 4: shows a section through the side view of the receiving device of FIG. 3;

FIG. 5: shows an exterior view of one embodiment of the plug-in device in a profile view (top), in a side view (bottom left), and in a front view (bottom right);

FIG. 6: shows another embodiment of a joining system according to the invention;

FIG. 7: shows another embodiment of a receiving device according to the invention for a joining system as shown in FIG. 6, and FIG. 8: shows another embodiment of a plug-in device according to the invention for a joining system as shown in FIG. 6.

FIG. 1 schematically shows an example of use of the joining system to join two materials A, B. The joining elements, that is to say a receiving device 1 and an associated plug-in device 2, are formed for example of plastic and are being used to join two wooden panels in furniture construction, wherein the wooden panels A, B for example are to be mechanically coupled and glued to one another.

In the embodiment shown, a plurality of receiving devices 1 are installed on the same wooden panel A, with a plurality of plug-in devices 2 being installed on a further wooden panel B. This enables the panels or materials to be stacked, for example, in order to ensure easy transportation. In a further scenario, the plug-in devices 2 may also be installed for example just before the two panels A, B are joined together. Depending on the use of the joining system, mixed arrangements of the joining elements are also possible, that is to say receiving devices and plug-in devices on each of the two wooden panels, as long as one plug-in device can be associated with each receiving device.

As shown in FIG. 2, the two joining elements 1, 2 each have a barb arrangement 3 for respectively anchoring the elements in a bore in the respective materials A, B. Furthermore, the receiving device 1 has a sleeve 4 for receiving a pin 5 of the plug-in device.

Preferably, the receiving device 1 is fully sunk into the wooden panel A. In the embodiment shown, the joining elements 1, 2 are cylindrical such that the plug-in device 2 can be installed in the respective wooden panel by means of a single bore and the receiving device 1 can be installed in the respective wooden panel by means of a two-stage bore.

Once the bores have been made in the materials A, B to be joined, the joining elements 1, 2 are in each case pressed into the bores. The wooden panels A, B can then be coated for example with adhesive and can be coupled to one another by clicking together the joining elements 1, 2.

FIG. 3 shows in the top part an exterior profile view of one embodiment of the receiving device, and in the bottom part a side view and a front view. Furthermore, FIG. 4 shows a section through the side view of FIG. 3.

Mounted in a front part of the receiving device are spreading elements 6 of the barb arrangement, which are arranged around the axis of extension in three rings which are spaced apart in the axial direction of the axis of extension 7, each of the rings having four mutually separate spreading elements 6. As a result, three times four retaining means 6 (spreading elements) in the form of rib structures are formed, the rib structures having gaps 8 for chip flow purposes. The rib structures are arranged directly below one another and serve to anchor the receiving device and the plug-in device to the material to be joined.

Thereafter there is a cylindrical cavity, in which two pawls 9 are mounted (domes). Said pawls are a retaining catch for securely joining the materials.

These are followed in a rear part of the receiving device by the spring elements 10, designed here as clamping cones, which are configured to interact with a belly region of the pin (see FIG. 5), wherein, when the pin is inserted, the spring element 10 pushes against the pin by way of a force acting radially relative to the axis of extension 7. By virtue of the interaction of the spring element 10 with the belly region of the pin, this radial force is converted into an axial force on the pin, which acts along the axis of extension 7 towards the front end such that, in response to the axial force, the pin is pushed along the axis of extension towards the front end. This gives rise to a spring effect on the parts to be joined, which in turn generates a bias, for example to ensure optimal adhesive bonding of the two wooden elements.

FIG. 5 shows in the top part an exterior profile view of one embodiment of the plug-in device, and in the bottom part a side view and a front view.

Mounted once again in a front part of the plug-in device are spreading elements 6 of the barb arrangement, which in the example shown is identical to the barb arrangement of the receiving device shown in FIG. 3. With regard to the barb arrangement, therefore, reference is made to the description relating to FIG. 3.

In a rear part, the plug-in device has a pin, surrounding a plug-in axis 11, for insertion into the receiving device shown in FIG. 3. The pin has a belly region 12 which surrounds the plug-in axis 11 and which is configured to enter into interaction with the spring elements 10 (see FIGS. 3 and 4) when the plug-in device and the receiving device are clicked together. The belly region 12 is dimensioned and shaped such that, when the pin is inserted in the sleeve, an axial force acting towards the rear end of the plug-in device can be generated on the pin as a result of the spring element 10 pushing against the belly region.

In the embodiment shown, the pin also has an edge 13 which surrounds the plug-in axis 11 and which, in interaction with the two pawls 9 shown in FIG. 3, forms a retaining catch for securely joining the materials.

FIG. 6 shows another embodiment of a joining system according to the invention comprising a receiving device 20 and a plug-in device 30. The receiving device 20 is additionally shown by FIG. 7, and the plug-in device 30 by FIG. 8. Here, the axis of extension 27 of the receiving device 20 and the plug-in axis 37 of the plug-in device 30 are parallel, in particular coaxial. The embodiment has a compact construction and can easily be connected to the respective workpiece by means of a respective bore on each workpiece side.

Both the receiving device 20 and the plug-in device 30 have a barb arrangement with corresponding spreading elements 26, 36.

The sleeve of the receiving device 20 has spring elements 21 which are designed to cooperate with the belly region 32 of the plug-in device 30. In the inserted state shown (FIG. 6), the spring elements 21 push against the belly region 32 and thereby generate a biasing force acting in the axial direction, which pushes the pin of the plug-in device 30 into the sleeve. Here, the spring elements 21 push against the waist 32*a* of the belly region. When the pin is pulled out of the sleeve, the spring elements thus act at a point closer to a belly end 32*b* of the belly region 32. This results in a greater (radial) force between the spring elements 21 and the belly region 32 and thus in an increased (axial) biasing force, which pushes the pin into the sleeve with correspondingly greater force.

Due to an edge 33 formed on the plug-in device 30, the pin can be pulled out at most to the point at which the spring elements 21 make contact with the edge 33. Any further pulling out is inhibited or suppressed by the spring elements 21 butting against the edge 33. Separation of the receiving device 20 and plug-in device 30 is no longer possible without destruction. For this purpose, the spring elements 21 are tailored in terms of size and arrangement to the design of the plug-in device 30, in particular to the design of the edge 33.

The plug-in device 30 has a stop 35. Said stop 35 prevents undesired sinking of the plug-in device into a workpiece. The front end of the plug-in device 30, on which the barb arrangement is provided, can thus be sunk in as far as the stop 35, that is to say until the stop 35 comes into contact with a surface of the workpiece (material). A bore provided for this purpose must accordingly be adapted to the diameter of the barb arrangement.

It will be understood that these illustrated figures schematically show only possible embodiments. The different approaches can also be combined with one another and with methods from the prior art.

The invention claimed is:

1. A receiving device for receiving a pin for mechanically joining two materials, wherein the receiving device has an elongate shape formed along an axis of extension, the receiving device comprising:
    a barb arrangement, at a front end, for anchoring the receiving device in a bore in a material, wherein the barb arrangement has a main body, surrounding the axis of extension, and has spreading elements protruding radially from the main body, the spreading elements being configured to, when the barb arrangement is pressed into the bore, exert a hooking effect to inhibit release of the barb arrangement from the bore; and
    a sleeve for receiving the pin, the sleeve surrounding the axis of extension, connected to the barb arrangement, and accessible from a rear end located opposite the front end,
    wherein the sleeve has a biasing arrangement for biasing the pin in a direction of the front end, wherein the sleeve is configured such that:
        the biasing arrangement has a spring element extending with a rounded shape in a circumferential direction, the spring element being configured as part of a clamping cone, wherein the spring element extends in the circumferential direction only over a partial circumference and is configured to interact with a belly region of the pin;
        when the pin is inserted, the spring element is configured to push against the pin with a force acting radially relative to the axis of extension, wherein the spring element is configured to cause the force to act on the belly region and to provide the force over a biasing section on the pin;
        the spring element is configured to interact with the belly region to generate an axial force along the axis of extension towards the front end on the pin; and
        in response to the axial force, the pin is pushed into the sleeve along the axis of extension towards the front end within a section on the sleeve that corresponds to the biasing section on the pin when the pin is inserted,
    wherein the sleeve has a latching arrangement which is configured to cooperate with an edge face of an edge of the pin,
    wherein the latching arrangement and the edge are configured to enable the pin to be inserted into the sleeve in the direction of the front end but to inhibit the pin from being pulled out in a direction of the rear end,
    wherein a normal to the edge face is oriented parallel to the axis of extension,
    wherein the spring element has a contacting region with an edge face counterpart for butting against the edge face, wherein a normal to the edge face counterpart is oriented parallel to the axis of extension, and
    wherein the spring element has a further contacting region for contacting the belly region of the pin and pushing radially against the belly region when the pin is inserted in the sleeve, wherein the further contacting region is adjacent to the edge face counterpart and a normal to the further contacting region is oriented perpendicular to the axis of extension.

2. The receiving device according to claim 1, wherein the latching arrangement has a pawl, wherein the pawl is biased towards the axis of extension such that the pawl is configured to enable the pin to be inserted into the sleeve in the direction of the front end but, by engaging in the edge, and to inhibit the pin from being pulled out in the direction of the rear end, wherein the latching arrangement is arranged closer than the biasing arrangement to the front end.

3. The receiving device according to claim 2, wherein the pawl has a contacting region with an edge face counterpart for butting against the edge face, wherein a normal to the edge face counterpart is oriented parallel to the axis of extension.

4. The receiving device according to claim 1, wherein the receiving device is made of plastic or glass fiber reinforced plastic.

5. The receiving device according to claim 1,
    wherein the spring element is a resilient lever element which extends along the axis of extension and which is configured such that, when the pin is inserted in the sleeve, a region of the resilient lever element projecting from the sleeve is configured to push radially against the belly region of the pin,
    wherein the biasing arrangement has a further spring element such that the spring element and the further spring element are located opposite one another, extend along the axis of extension, and are configured as parts of the clamping cone such that, when the pin is inserted in the sleeve, a region of each resilient lever element projecting from the sleeve is configured to push radially against the belly region of the pin.

6. The receiving device according to claim 1, wherein the receiving device is part of a joining system for mechanically joining two materials, wherein the joining system comprises:
    the receiving device, and
    a plug-in device having the pin, wherein the joining system is configured such that, when the pin is inserted in the sleeve, the pin is clamped to the sleeve in an axial direction in relation to the axis of extension, wherein the pin and the sleeve are configured to push axially against one another within the biasing section on the pin when the pin is inserted into the receiving device,
    wherein the receiving device and the plug-in device are configured such that a length of the biasing section is at least 0.5 mm.

7. The receiving device according to claim 6, wherein the plug-in device has an elongate shape formed along a plug-in axis and comprises:
    a second barb arrangement for anchoring the plug-in device in a second bore in a second material, wherein the second barb arrangement has a second main body, surrounding the plug-in axis, and has second spreading elements protruding radially from the second main body, the second spreading elements being configured to, when the second barb arrangement is pressed into the second bore, exert a hooking effect to inhibit release of the second barb arrangement from the second bore; and
    the pin, located at an end of the plug-in device opposite the second barb arrangement of the plug-in device, for insertion into the sleeve, the pin surrounding the plug-in axis and being connected to the second barb arrangement of the plug-in device, wherein the belly region of the pin surrounds the plug-in axis and is dimensioned and shaped such that, when the pin is inserted in the sleeve, the belly region interacts with the spring element of the sleeve to, as a result of the spring element being pushed against a contact face of the belly region based on the force acting radially relative to the plug-in axis, generate the axial force acting along the axis of extension towards the front end on the pin, wherein the edge of the pin surrounds the plug-in axis, the edge providing the edge face in a direction towards the second barb arrangement of the plug-in device, and wherein the belly region of the pin has a waist with a waist diameter which is defined in relation to the plug-in axis, and a belly end with a maximum belly diameter which is located at a distance from the waist along the plug-in axis, wherein the maximum belly diameter is larger than the waist diameter, the belly end is arranged further away from the second barb arrangement of the plug-in device than the waist, and a distance between the waist and the belly end defines the biasing section on the pin, wherein, when the pin is inserted in the sleeve, the spring element is configured to generate a smaller axial force towards the front end based on an interaction with the waist than based on an interaction with the belly end.

8. A receiving device for receiving a pin for mechanically joining two materials, wherein the receiving device has an elongate shape formed along an axis of extension, the receiving device comprising:

a barb arrangement, at a front end, for anchoring the receiving device in a bore in a material, wherein the barb arrangement has a main body, surrounding the axis of extension, and has spreading elements protruding radially from the main body, the spreading elements being configured to, when the barb arrangement is pressed into the bore, exert a hooking effect to inhibit release of the barb arrangement from the bore; and a sleeve for receiving the pin, the sleeve surrounding the axis of extension, connected to the barb arrangement, and accessible from a rear end located opposite the front end, wherein the sleeve has a biasing arrangement for biasing the pin in a direction of the front end, wherein the sleeve is configured such that:

the biasing arrangement has a spring element extending with a rounded shape in a circumferential direction, the spring element being configured as part of a clamping cone, wherein the spring element extends in the circumferential direction only over a partial circumference and is configured to interact with a belly region of the pin;

when the pin is inserted, the spring element is configured to push against the pin with a force acting radially relative to the axis of extension, wherein the spring element is configured to cause the force to act on the belly region and to provide the force over a biasing section on the pin;

the spring element is configured to interact with the belly region to generate an axial force along the axis of extension towards the front end on the pin; and in response to the axial force, the pin is pushed into the sleeve along the axis of extension towards the front end within a section on the sleeve that corresponds to the biasing section on the pin when the pin is inserted, wherein the spring element is configured to cooperate with an edge face of an edge of the pin, wherein the spring element and the edge are configured to enable the pin to be inserted into the sleeve in the direction of the front end but, by cooperating with the edge, to inhibit the pin from being pulled out in a direction of the rear end, wherein a normal to the edge face is oriented parallel to the axis of extension, wherein the spring element has a contacting region with an edge face counterpart for butting against the edge face, wherein a normal to the edge face counterpart is oriented parallel to the axis of extension, and wherein the spring element has a further contacting region for contacting the belly region of the pin and pushing radially against the belly region when the pin is inserted in the sleeve, wherein the further contacting region is adjacent to the edge face counterpart and a normal to the further contacting region is oriented perpendicular to the axis of extension.

9. The receiving device according to claim 8, wherein the spring element is a resilient lever element which extends along the axis of extension and which is configured such that, when the pin is inserted in the sleeve, a region of the resilient lever element projecting from the sleeve is configured to push radially against the belly region of the pin, wherein the biasing arrangement has a further spring element such that the spring element and the further spring element are located opposite one another, extend along the axis of extension, and are configured as parts of the clamping cone such that, when the pin is inserted in the sleeve, a region of each resilient lever element projecting from the sleeve is configured to push radially against the belly region of the pin.

10. The receiving device according to claim 8, wherein the receiving device is part of a joining system for mechanically joining two materials, wherein the joining system comprises:

the receiving device, and a plug-in device having the pin, wherein the joining system is configured such that, when the pin is inserted in the sleeve, the pin is clamped to the sleeve in an axial direction in relation to the axis of extension, wherein the pin and the sleeve are configured to push axially against one another within the biasing section on the pin when the pin is inserted into the receiving device, wherein the receiving device and the plug-in device are configured such that a length of the biasing section is at least 0.5 mm.

11. The receiving device according to claim 10, wherein the plug-in device has an elongate shape formed along a plug-in axis and comprises:

a second barb arrangement for anchoring the plug-in device in a second bore in a second material, wherein the second barb arrangement has a second main body, surrounding the plug-in axis, and has second spreading elements protruding radially from the second main body, the second spreading elements being configured to, when the second barb arrangement is pressed into the second bore, exert a hooking effect to inhibit release of the second barb arrangement from the second bore; and the pin, located at an end of the plug-in device opposite the second barb arrangement of the plug-in device, for insertion into the sleeve, the pin surrounding the plug-in axis and being connected to the second barb arrangement of the plug-in device, wherein the belly region of the pin surrounds the plug-in axis and is dimensioned and shaped such that, when the pin is inserted in the sleeve, the belly region interacts with the spring element of the sleeve to, as a result of the spring element being pushed against a contact face of the belly region based on the force acting radially relative to the plug-in axis, generate the axial force acting along the axis of extension towards the front end on the pin, wherein the edge of the pin surrounds the plug-in axis, the edge providing the edge face in a direction towards the second barb arrangement of the plug-in device, and wherein the belly region of the pin has a waist with a waist diameter which is defined in relation to the plug-in axis, and a belly end with a maximum belly diameter which is located at a distance from the waist along the plug-in axis, wherein the maximum belly diameter is larger than the waist diameter, the belly end is arranged further away from the second barb arrangement of the plug-in device than the waist, and a distance between the waist and the belly end defines the biasing section on the pin, wherein, when the pin is inserted in the sleeve, the spring element is configured to generate a smaller axial force towards the front end based on an interaction with the waist than based on an interaction with the belly end.

12. A receiving device for receiving a pin for mechanically joining two materials, wherein the receiving device has an elongate shape formed along an axis of extension, the receiving device comprising:

a barb arrangement, at a front end, for anchoring the receiving device in a bore in a material, wherein the barb arrangement has a main body, surrounding the axis of extension, and has spreading elements protruding radially from the main body, the spreading elements being configured to, when the barb arrangement is pressed into the bore, exert a hooking effect to inhibit release of the barb arrangement from the bore; and a sleeve for receiving the pin, the sleeve surrounding the axis of extension, connected to the barb arrangement, and accessible from a rear end located opposite the front end, wherein the sleeve has a biasing arrangement for biasing the pin in a direction of the front end, wherein the sleeve is configured such that:

the biasing arrangement has a spring element, which is configured to interact with a belly region of the pin, and the spring element is configured as a part of a clamping cone;

when the pin is inserted, the spring element is configured to push against the pin with a force acting radially relative to the axis of extension, wherein the spring element is configured to cause the force to act on the belly region and to provide the force over a biasing section on the pin;

the spring element is configured to interact with the belly region to generate an axial force along the axis of extension towards the front end on the pin; and in response to the axial force, the pin is pushed into the sleeve along the axis of extension towards the front end within a section on the sleeve that corresponds to the biasing section on the pin when the pin is inserted, wherein the sleeve has a latching arrangement which is configured to cooperate with an edge face of an edge of the pin, wherein the latching arrangement and the edge are configured to enable the pin to be inserted into the sleeve in the direction of the front end but to inhibit the pin from being pulled out in a direction of the rear end, wherein a normal to the edge face is oriented parallel to the axis of extension, wherein the spring element has a contacting region for contacting the belly region of the pin and pushing radially against the belly region when the pin is inserted in the sleeve, wherein a normal to the contacting region is oriented perpendicular to the axis of extension, and wherein the spring element has a further contacting region with an edge face counterpart for butting against the edge face, wherein a normal to the edge face counterpart is oriented parallel to the axis of extension and the contacting region is adjacent to the edge face counterpart.

13. The receiving device according to claim 12, wherein the receiving device is part of a joining system for mechanically joining two materials, wherein the joining system comprises:

the receiving device, and a plug-in device having the pin, wherein the joining system is configured such that, when the pin is inserted in the sleeve, the pin is clamped to the sleeve in an axial direction in relation to the axis of extension, wherein the pin and the sleeve are configured to push axially against one another within the biasing section on the pin when the pin is inserted into the receiving device, wherein the receiving device and the plug-in device are configured such that a length of the biasing section is at least 0.5 mm.

14. The receiving device according to claim 13, wherein the plug-in device has an elongate shape formed along a plug-in axis and comprises:

a second barb arrangement for anchoring the plug-in device in a second bore in a second material, wherein the second barb arrangement has a second main body, surrounding the plug-in axis, and has second spreading elements protruding radially from the second main body, the second spreading elements being configured to, when the second barb arrangement is pressed into the second bore, exert a hooking effect to inhibit release of the second barb arrangement from the second bore; and the pin, located at an end of the plug-in device opposite the second barb arrangement of the plug-in device, for insertion into the sleeve, the pin surrounding the plug-in axis and being connected to the second barb arrangement of the plug-in device, wherein the belly region of the pin surrounds the plug-in axis and is dimensioned and shaped such that, when the pin is inserted in the sleeve, the belly region interacts with the spring element of the sleeve to, as a result of the spring element being pushed against a contact face of the belly region based on the force acting radially relative to the plug-in axis, generate the axial force acting along the axis of extension towards the front end on the pin, wherein the edge of the pin surrounds the plug-in axis, the edge providing the edge face in a direction towards the second barb arrangement of the plug-in device, and wherein the belly region of the pin has a waist with a waist diameter which is defined in relation to the plug-in axis, and a belly end with a maximum belly diameter which is located at a distance from the waist along the plug-in axis, wherein the maximum belly diameter is larger than the waist diameter, the belly end is arranged further away from the second barb arrangement of the plug-in device than the waist, and a distance between the waist and the belly end defines the biasing section on the pin, wherein, when the pin is inserted in the sleeve, the spring element is configured to generate a smaller axial force towards the front end based on an interaction with the waist than based on an interaction with the belly end.

15. A receiving device for receiving a pin for mechanically joining two materials, wherein the receiving device has an elongate shape formed along an axis of extension, the receiving device comprising:

a barb arrangement, at a front end, for anchoring the receiving device in a bore in a material, wherein the barb arrangement has a main body, surrounding the axis of extension, and has spreading elements protruding radially from the main body, the spreading elements being configured to, when the barb arrangement is pressed into the bore, exert a hooking effect to inhibit release of the barb arrangement from the bore; and a sleeve for receiving the pin, the sleeve surrounding the axis of extension, connected to the barb arrangement, and accessible from a rear end located opposite the front end, wherein the sleeve has a biasing arrangement for biasing the pin in a direction of the front end, wherein the sleeve is configured such that:

the biasing arrangement has a spring element, which is configured to interact with a belly region of the pin, and the spring element is configured as a part of a clamping cone;

when the pin is inserted, the spring element is configured to push against the pin with a force acting radially relative to the axis of extension, wherein the spring element is configured to cause the force to act on the belly region and to provide the force over a biasing section on the pin;

the spring element is configured to interact with the belly region to generate an axial force along the axis of extension towards the front end on the pin; and in response to the axial force, the pin is pushed into the sleeve along the axis of extension towards the front end within a section on the sleeve that corresponds to the biasing section on the pin when the pin is inserted, wherein the spring element is configured to cooperate with an edge face of an edge of the pin, wherein the spring elements and the edge are configured to enable the pin to be inserted into the sleeve in the direction of the front end but, by cooperating with the edge, to inhibit the pin from being pulled out in a direction of the rear end, wherein a normal to the edge face is oriented parallel to the axis of extension, wherein the spring element has a contacting region for contacting the belly region of the pin and pushing radially against the belly region when the pin is inserted in the sleeve, wherein a normal to the contacting region is oriented perpendicular to the axis of extension, and wherein the spring element has a further contacting region with an edge face counterpart for butting against the edge face, wherein a normal to the edge face counterpart is oriented parallel to the axis of extension and the contacting region is adjacent to the edge face counterpart.

16. The receiving device according to claim 15, wherein the receiving device is part of a joining system for mechanically joining two materials, wherein the joining system comprises:

the receiving device, and a plug-in device having the pin, wherein the joining system is configured such that, when the pin is inserted in the sleeve, the pin is clamped to the sleeve in an axial direction in relation to the axis of extension, wherein the pin and the sleeve are configured to push axially against one another within the biasing section on the pin when the pin is inserted into the receiving device, wherein the receiving device and the plug-in device are configured such that a length of the biasing section is at least 0.5 mm.

17. The receiving device according to claim 16, wherein the plug-in device has an elongate shape formed along a plug-in axis and comprises:

a second barb arrangement for anchoring the plug-in device in a second bore in a second material, wherein the second barb arrangement has a second main body, surrounding the plug-in axis, and has second spreading elements protruding radially from the second main body, the second spreading elements being configured to, when the second barb arrangement is pressed into the second bore, exert a hooking effect to inhibit release of the second barb arrangement from the second bore; and the pin, located at an end of the plug-in device opposite the second barb arrangement of the plug-in device, for insertion into the sleeve, the pin surrounding the plug-in axis and being connected to the second barb arrangement of the plug-in device, wherein the belly region of the pin surrounds the plug-in axis and is dimensioned and shaped such that, when the pin is inserted in the sleeve, the belly region interacts with the spring element of the sleeve to, as a result of the spring element being pushed against a contact face of the belly region based on the force acting radially relative to the plug-in axis, generate the axial force acting along the axis of extension towards the front end on the pin, wherein the edge of the pin surrounds the plug-in axis, the edge providing the edge face in a direction towards the second barb arrangement of the plug-in device, and wherein the belly region of the pin has a waist with a waist diameter which is defined in relation to the plug-in axis, and a belly end with a maximum belly diameter which is located at a distance from the waist along the plug-in axis, wherein the maximum belly diameter is larger than the waist diameter, the belly end is arranged further away from the second barb arrangement of the plug-in device than the waist, and a distance between the waist and the belly end defines the biasing section on the pin, wherein, when the pin is inserted in the sleeve, the spring element is configured to generate a smaller axial force towards the front end based on an interaction with the waist than based on an interaction with the belly end.

\* \* \* \* \*